United States Patent
Ericson et al.

(10) Patent No.: US 9,426,815 B2
(45) Date of Patent: Aug. 23, 2016

(54) METHOD AND ARRANGEMENT FOR DYNAMIC ALLOCATION OF A SHARED BANDWIDTH

(75) Inventors: Mårten Ericson, Luleå (SE); Bengt Lindoff, Bjärred (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 168 days.

(21) Appl. No.: 14/361,564

(22) PCT Filed: Dec. 27, 2011

(86) PCT No.: PCT/SE2011/051592
§ 371 (c)(1),
(2), (4) Date: May 29, 2014

(87) PCT Pub. No.: WO2013/100827
PCT Pub. Date: Jul. 4, 2013

(65) Prior Publication Data
US 2014/0335883 A1    Nov. 13, 2014

(51) Int. Cl.
*H04W 72/00* (2009.01)
*H04W 72/08* (2009.01)
*H04L 5/00* (2006.01)
(Continued)

(52) U.S. Cl.
CPC ............. *H04W 72/085* (2013.01); *H04L 5/001* (2013.01); *H04L 5/0048* (2013.01); *H04L 5/0053* (2013.01); *H04L 5/0098* (2013.01); *H04W 52/26* (2013.01); *H04W 72/0486* (2013.01); *H04W 52/143* (2013.01); *H04W 52/146* (2013.01); *H04W 52/241* (2013.01); *H04W 52/367* (2013.01); *H04W 52/38* (2013.01)

(58) Field of Classification Search
CPC ................................................... H04W 72/085
See application file for complete search history.

(56) References Cited

U.S. PATENT DOCUMENTS 8,886,247 B1 * 11/2014 Price ............... H04B 1/3838
                                                370/318
2010/0248739 A1 * 9/2010 Westerberg ....... H04W 72/0486
                                                455/453
(Continued)

FOREIGN PATENT DOCUMENTS

EP            2203011 A1    6/2010
WO      2008088254 A1    7/2008
(Continued)

OTHER PUBLICATIONS

Office Action in EP application No. 11878988.2 mailed Nov. 5, 2015.
(Continued)

*Primary Examiner* — Justin Lee
(74) *Attorney, Agent, or Firm* — Patent Portfolio Builders, PLLC

(57) ABSTRACT

A radio network node and a method therein, for controlling usage of RAT and bandwidth in a radio communication system. The method includes allocating a first RAT to a first bandwidth, allocating a second RAT to a second bandwidth, and allocating the first and second RATs to a third bandwidth comprising a part of the first bandwidth and/or a part of the second bandwidth. When the first RAT has a higher load than the second RAT, the method includes transmitting data for the first RAT in both the first third bandwidths, transmitting data for the second RAT only in the second bandwidth, and transmitting common control signals and/or pilot signals for the first RAT in the first and third bandwidths.

22 Claims, 5 Drawing Sheets

(51) Int. Cl.
*H04W 52/26* (2009.01)
*H04W 72/04* (2009.01)
*H04W 52/14* (2009.01)
*H04W 52/24* (2009.01)
*H04W 52/36* (2009.01)
*H04W 52/38* (2009.01)

(56) References Cited

U.S. PATENT DOCUMENTS

2011/0007695 A1  1/2011  Choi et al.
2011/0077015 A1* 3/2011  Saily .................... H04W 16/14
                                                   455/450
2011/0286408 A1* 11/2011 Flore .................... H04L 5/0007
                                                   370/329

FOREIGN PATENT DOCUMENTS

| WO | WO 2008/088254 A1 | 7/2008 |
| WO | 2010025279 A1 | 3/2010 |
| WO | 2010068155 A1 | 6/2010 |
| WO | WO 2010/068155 A1 | 6/2010 |
| WO | 2010091713 A1 | 8/2010 |
| WO | 2010093647 A2 | 8/2010 |
| WO | WO 2010/091713 A1 | 8/2010 |
| WO | WO 2010/093647 A2 | 8/2010 |
| WO | 2011134099 A1 | 11/2011 |
| WO | 2011146766 A1 | 11/2011 |
| WO | WO 2011/146766 A1 | 11/2011 |

OTHER PUBLICATIONS

Written Opinion of the International Searching Authority for PCT Application No. PCT/SE2011/051592 mailed Jan. 29, 2013, 10 pages.
Written Opinion of the International Searching Authority for PCT Application No. PCT/SE2011/051593 mailed Jan. 29, 2013, 9 pages.
Gillet: "Analysis: The impact of European Spectrum harmonization on LTE network deployments" Wireless Intelligence; European Spectrum harmonization; Jun. 2011, 15 pages.
Jean-Philippe Javaudin et al: "On Inter-Cell Interference in OFDMA Wireless Systems", France Telecom, R&D Division, 4 rue du Clos Courtel, BP91226, 35512 Cession Sevigne, France, May 4, 2005; 4 pages.
Ghamari, S. et al. "An Approach for Automated Spectrum Refarming for Multiple Radio Access Technologies," Technical Symposium at ITU Telecom World, 2011, pp. 187-192.
International Search Report for PCT Application No. PCT/SE2011/051593 mailed Jan. 29, 2013, 5 pages.
International Search Report for PCT Application No. PCT/SE2011/051591 mailed Jan. 17, 2013, 4 pages.
International Search Report for PCT Application No. PCT/SE2011/051592 mailed Jan. 29, 2013, 4 pages.
Javaudin, J.P. et al. "On Inter-Cell Interference in OFDMA Wireless Systems," France Telecom, R&D Division, 2005, pp. 4.
Jose Gillet "Analysis: The impact of European Spectrum harmonisation on LTE network deployments," Wireless Intelligence, Jun. 2011, pp. 15.
Nritten Opinion of the International Searching Authority for PCT Application No. PCT/SE2011/051593 mailed Jan. 29, 2013, 9 pages.
Written Opinion of the International Searching Authority for PCT Application No. PCT/SE2011/051591 mailed Jan. 17, 2013, 9 pages.
Written Opinion of the International Searching Authority for PCT Application No. PCT/SE2011/051592 mailed Jan. 25, 2013, 10 pages

* cited by examiner

METHOD AND ARRANGEMENT FOR DYNAMIC ALLOCATION OF A SHARED BANDWIDTH

CROSS REFERENCE TO RELATED APPLICATION

This application is a 35 U.S.C. §371 national stage application of PCT International Application No. PCT/SE2011/051592, filed on 27 Dec. 2011, the disclosure and content of which is incorporated by reference herein in its entirety. The above-referenced PCT International Application was published in the English language as International Publication No. WO 2013/100827 A1 on 4 Jul. 2013.

TECHNICAL FIELD

Embodiments herein relate to a radio network node and a method therein. In particular, embodiments relate to controlling usage of Radio Access Technology (RAT) and bandwidth in a radio communications system.

BACKGROUND

Communication devices such as terminals are enabled to communicate wirelessly in a wireless communications system, sometimes also referred to as a cellular radio system or a cellular network. The communication may be performed e.g. between two user equipments, between a user equipment and a regular telephone and/or between a user equipment and a server via a Radio Access Network (RAN) and possibly one or more core networks, comprised within the wireless communications system. The RAN is configured to implement one or more RATs.

Terminals are also known as e.g. User Equipments (UEs), mobile terminals, wireless terminals, mobile stations, mobile telephones, cellular telephones, or laptops with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity.

The wireless communications system covers a geographical area which is divided into cell areas, wherein each cell area being served by a radio network node such as a Base Station (BS), e.g. a Radio Base Station (RBS), which sometimes may be referred to as e.g. eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several radio access and communication technologies. The base stations communicate over the radio interface operating on radio frequencies with the user equipments within range of the base stations.

In some RANs implementing one or more RATs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Special Mobile).

In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

According to 3GPP/GERAN, a user equipment has a multi-slot class, which determines the maximum transfer rate in the uplink and downlink direction. GERAN is an abbreviation for GSM EDGE Radio Access Network. EDGE is further an abbreviation for Enhanced Data rates for GSM Evolution.

In radio communications systems, the radio spectrum is currently and will probably also in the future be a scarce resource. With the introduction of UMTS, new radio spectrum became available, primarily in the 2 GHz band. For some operators the new radio spectrum has been very expensive. Today there are around 10 different frequency bands possible for UMTS deployment, however not all frequency bands are available in every region of the world.

In spite of the number of available frequency bands, the demand for more radio spectrum will very likely lead to so called re-farming (which will be explained below) of already used radio spectrum. This can be seen as a radio spectrum sharing on a very static basis. Most countries in the EU have announced firm plans and timelines for the re-farming of radio spectrum in 900/1800 MHz, the frequency bands typically used for 2G services, such as GSM. Fifteen markets have already implemented re-farming policies while eight others are expected to do so between the years 2011 and 2014. Today the operators have a license to use UMTS in the 900/1800 MHz frequency band, where GSM formerly was the only technique allowed. In some countries, operators have already started re-farming; for example in Finland UMTS is re-farming the 900 MHz.

Furthermore, the same re-farming demand will happen, or already is happening, with LTE. For LTE, the primary frequency band is the 2.6 GHz frequency band in the EU, but elsewhere in the world other frequency bands are used as the primary frequency band. The standard for LTE allows a wide range of frequency bands from 700 MHz to 2.6 GHz, including for example the 1800 MHz frequency band. Thus, it is likely that operators with LTE also will re-farm their existing spectrum such as the 1800 MHz frequency band, sharing frequencies from both their GSM or HSPA frequencies.

By re-farming, when used herein, is meant that base stations for a first RAT is co-sited with base stations for a second RAT. For example, UMTS base stations may be co-sited with GSM base stations, or LTE base stations may be co-sited with UMTS base stations. In fact, it is even possible to share the same Radio Base Station (RBS), e.g. if bought from the same vendor, and share the same Power Amplifier (PA). An example of this is a radio base station, which supports different RATs in one and the same radio base station, i.e. a radio base station supporting GSM/EDGE, WCDMA/HSPA and LTE. Note that it is not strictly necessary to utilize the same RBS and PA to perform re-farming between for example LTE and HSPA, especially if it is done on a very static and slow basis.

A problem with existing solutions such as re-farming is that they are static and not based on the current traffic situation. For instance, in a migration scenario, the number of terminals only supporting legacy RATs such as GSM/HSPA, might be large compared to terminals supporting both new RATs, such as LTE, and legacy RATs such as GSM/HSPA, giving indications to allocate a large part of the radio spectrum to the legacy RAT; GSM/HSPA, and less to the new RAT; LTE. Then, the LTE terminals might not be able to utilize their full data rate potential, due to only a small bandwidth, e.g. 5 MHz, allocated to LTE instead of the full bandwidth, e.g. 10 MHz. This will be the case also when the actual number of active HSPA terminals connected to a specific cell is small. Hence static solutions will affect the data rate and may thus reduce user experience for new terminals and/or modems supporting new RATs such as LTE.

SUMMARY

It is therefore an object of embodiments herein to provide a way of improving performance in a radio communications system According to a first aspect of embodiments herein, the object is achieved by a method in a radio network node for controlling usage of Radio Access Technology (RAT) and bandwidth in a radio communication system. The radio communication system comprises the radio network node which is configured to support transmission and reception of signals in a first RAT and in a second RAT. The radio communication system comprises further a plurality of terminals, each of which terminals supports only the first RAT, only the second RAT or both RATs.

The radio network node allocates the first RAT to a first bandwidth, the second RAT to a second bandwidth, and the first RAT and the second RAT to a third bandwidth. The third bandwidth comprises a part of the first bandwidth and/or a part of the second bandwidth. When the first RAT has a higher load than the second RAT, the radio network node transmits data for the first RAT in both the first bandwidth and in the third bandwidth, data for the second RAT only in the second bandwidth, and common control signals and/or pilot signals for the first RAT in the first and third bandwidth.

According to a second aspect of embodiments herein, the object is achieved by a radio network node for controlling usage of Radio Access Technology (RAT) and bandwidth in a radio communication system. The radio communication system comprises the radio network node which is configured to support transmission and reception of signals in a first RAT and in a second RAT. The radio communication system comprises further a plurality of terminals, each of which terminals supports only the first RAT, only the second RAT or both RATs.

The radio network node comprises an allocating circuit which is configured to allocate the first RAT to a first bandwidth, allocate the second RAT to a second bandwidth, and to allocate the first RAT and the second RAT to a third bandwidth. The third bandwidth comprises a part of the first bandwidth and/or a part of the second bandwidth.

The radio network node comprises further a transmitting circuit which is configured to, when the first RAT has a higher load than the second RAT, transmit data for the first RAT in both the first bandwidth and in the third bandwidth, transmit data for the second RAT only in the second bandwidth, and to transmit common control signals and/or pilot signals for the first RAT and in both the first bandwidth and in the third bandwidth.

Since data for the first RAT is transmitted in both the first and the third bandwidth, since data for the second RAT is transmitted only in the second bandwidth, and since common control signals and/or pilot signals for the first RAT are transmitted in both he first and third bandwidth, when the first RAT has a higher load than the second RAT, only the first RAT having the higher load is allowed to transmit data in the third bandwidth which is a common bandwidth for both the first RAT and the second RAT. Thereby a more efficient usage of RATs and bandwidths is achieved. This results in an improved performance in the communications system, since the available RATs and bandwidths are more efficiently used.

An advantage with embodiments herein is that an optimized RAT utilization is made in the radio network node given the allocated system bandwidth resulting in improved system capacity and end user experience.

A further advantage with embodiments herein is that an adaptation to the varying traffic situations over time, e.g. over a day, is possible. For example, one RAT may have a higher load during a certain time period of the day, and another RAT may have a higher load on another time period of the day, and embodiments herein will adapt to these situations and resources will utilized in an efficient way.

BRIEF DESCRIPTION OF THE DRAWINGS

Examples of embodiments herein will be described in more detail with reference to attached drawings in which.

DETAILED DESCRIPTION

Embodiments herein will be exemplified in the following non-limiting description. Further, embodiments will be described with reference to the RATs WCDMA/HSPA and LTE, but it should be understood that other RATs may be used. Furthermore, embodiments will be described with reference to two RATs, but it should be understood that embodiments may also comprise three or more RATs.

By embodiments herein is provided an adaptation of the usage of the radio spectrum depending on the current traffic and load situation.

Figure 1:
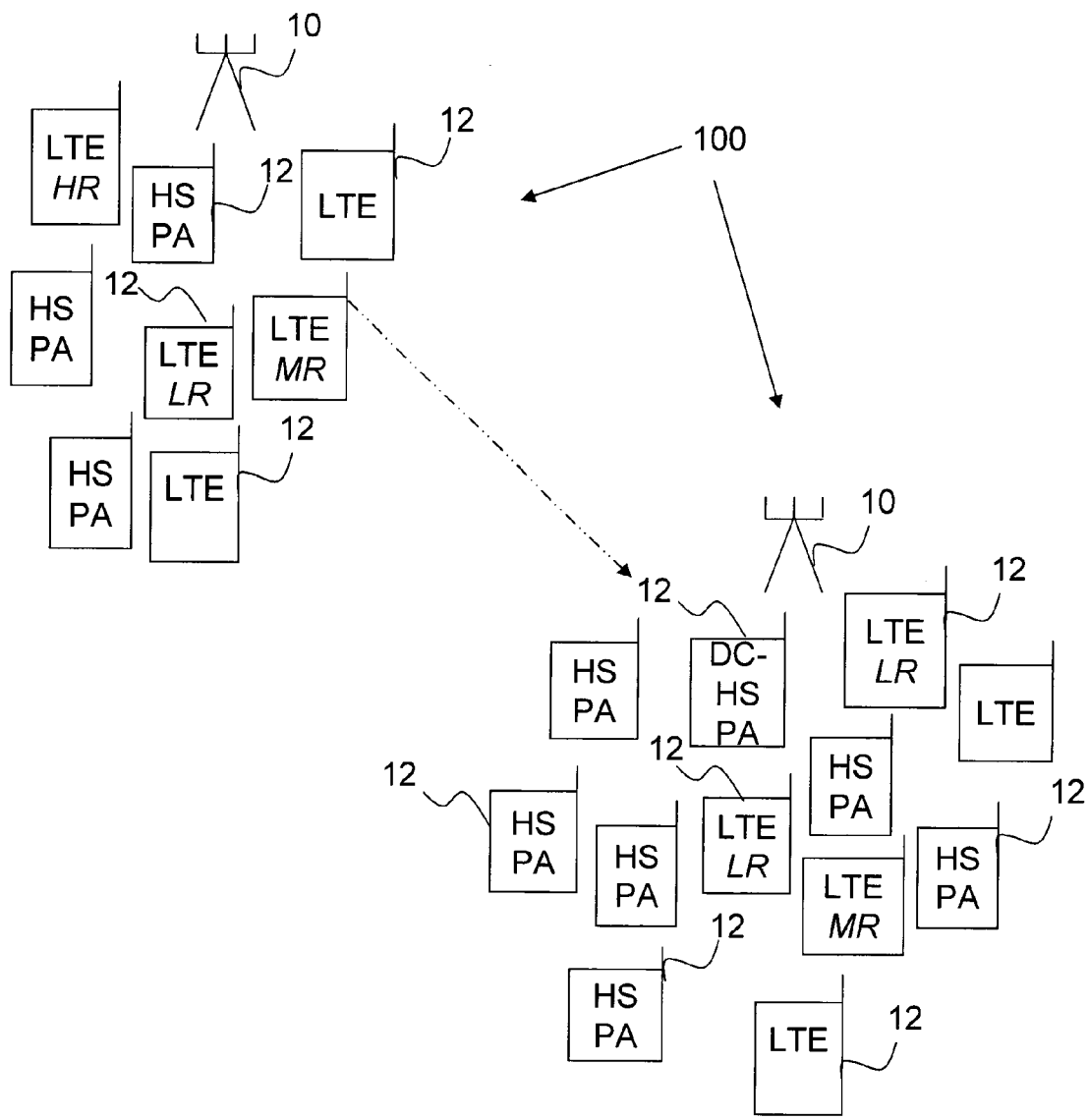
FIG. 1 is a schematic block diagram illustrating embodiments in a communications system.

FIG. 1 is a schematic overview of a radio communications network 100, implementing one or more RATs. The radio communications network 100 may be implementing one or more of Long Term Evolution (LTE), LTE-Advanced network, 3rd Generation Partnership Project (3GPP) Wideband Code Division Multiple Access (WCDMA), WCDMA/High-Speed Packet Access (WCDMA/HSPA), System for Mobile communications/Enhanced Data rate for GSM Evolution (GSM/EDGE), Worldwide Interoperability for Microwave Access (WiMax), and/or Ultra Mobile Broadband (UMB), just to mention a few possible implementations. Thus, the communications network 100 may be a multi-RAT communications network.

The communications network 100 comprises one or more radio network node 10, such as a radio base station 10, providing radio coverage over at least one geographical area forming a cell (not shown).

The radio network node 10, may also be referred to as e.g. a NodeB, an evolved Node B (eNB, eNode B), a Radio Base Station (RBS), a base transceiver station, Access Point Base Station, base station router, or any other network unit capable to communicate with a terminal 12 within the cell depending e.g. of the RAT and terminology used. Also, the radio network node 10 may further serve one or more cells and the radio network node 10 serving the terminal 12 may further be exemplified as a relay node or a beacon node.

Further, the radio network node 10 is configured to support transmission and reception of signals in a first RAT and in a second RAT. For example, the radio network node 10 may support one or more of LTE, HSPA, and Dual Carrier (DC)-HSPA.

The radio network node 10 transmits and receives signals, such as synchronization signals, pilot signals, cell reference symbols, broadcast signals, control channel signals or data signals according well defined principles and standards for the respective RAT and will therefore not be described in more detail here.

One or more terminals 12 are served in the cell by the radio network node 10 and is communicating with the radio network node 10. The terminal 12 transmits data over a radio interface to the radio network node 10 in an uplink (UL) transmission and the radio network node 10 transmits data to the user equipment 12 in a downlink (DL) transmission.

It should be understood that the term "terminal" is a non-limiting term which means any wireless terminal, user equipment, device or node e.g. Personal Digital Assistant (PDA), laptop, mobile, sensor, modem or relay. The terminal may be any device configured to communicate in the communication network. The terminal may also be capable and not capable of performing inter-frequency measurements without gaps.

Further, the one or more terminals 12 are configured to support only the first RAT, or only the second RAT or both RATs, as well as dual cell, multi-carrier, operation within one or both RATs. As schematically shown in FIG. 1, the terminals 12 may support one or more of LTE, HSPA, and Dual Carrier (DC)-HSPA.

In some embodiments, the terminals operating in LTE uses services requiring low rate, such as speech services. Such terminals are herein referred to as LTE Low Rate (LTE-LR) terminals. Further, in some embodiments, the terminals operating in LTE uses services requiring medium rate, such as streaming. Such terminals are herein referred to as LTE Medium Rate (LTE-MR) terminals. Furthermore, in some embodiments, the terminals operating in LTE uses services requiring high rate, such as data transfer. Such terminals are herein referred to as LTE High Rate (LTE-HR) terminals.

The capabilities of the one or more terminals 12 are known to the radio network node 10 via signalling to the radio network node 10 according to well defined principles and standards and will therefore not be described in more detail here.

Figure 2:
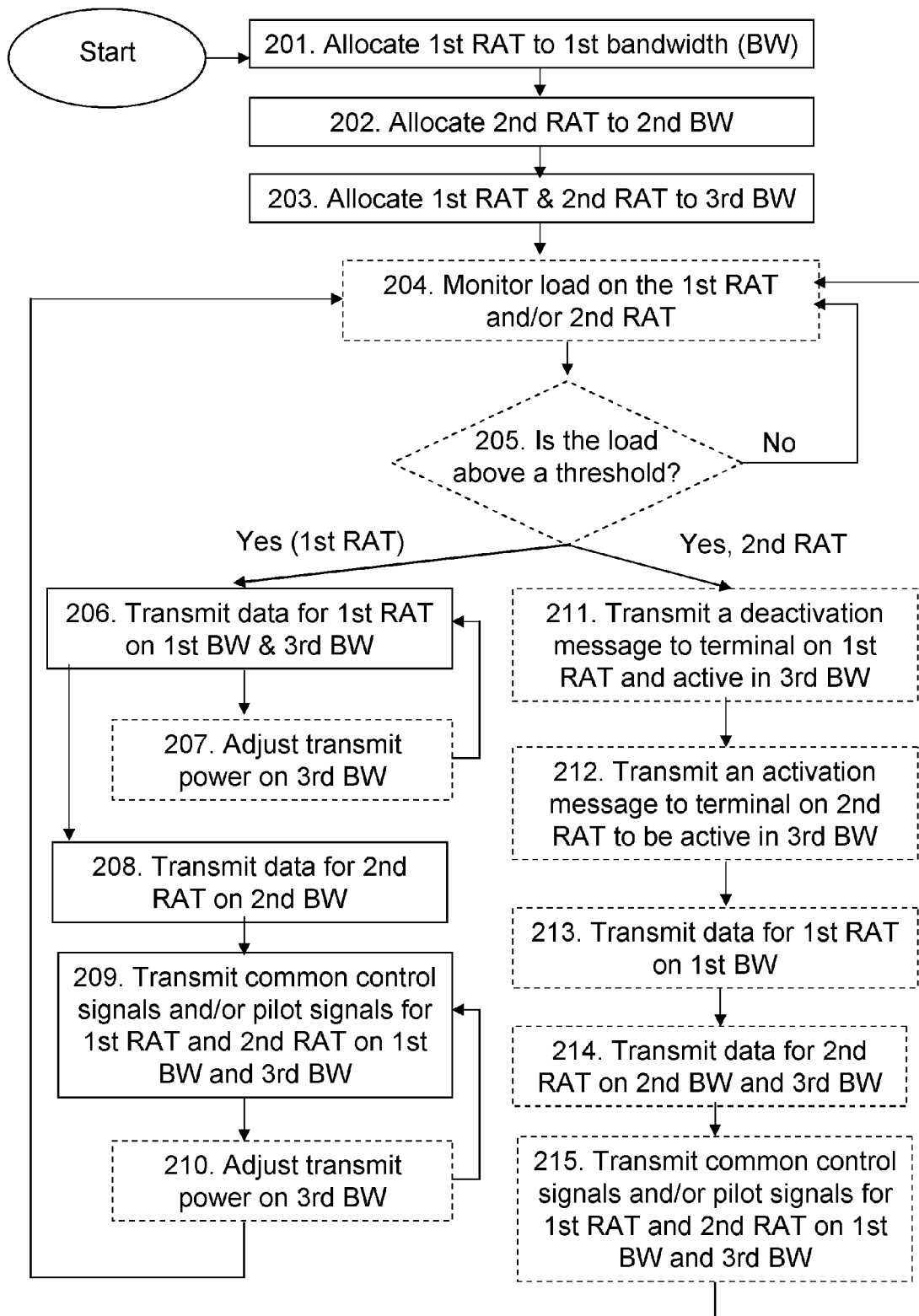
FIG. 2 is a flowchart depicting embodiments of a method in a radio network node.

FIG. 2 is a flowchart depicting embodiments of a method in the radio network node 10 for controlling usage of RAT and bandwidth in the radio communications system 100. As previously described, the radio communications system 100 comprises the radio network node 10 configured to support transmission and reception of signals in a first RAT and in a second RAT. The signal associated with the respective first or second RAT may be a synchronization signal, a pilot signal, cell reference symbols, a broadcast signal, a control channel signal or a data signal. The signals are transmitted and received according to well-defined principles and standards and therefore the transmission and reception will not be described in more detail here.

Further, the radio communications system 100 may comprise a plurality of terminals 12. Each terminal 12 may be configured to support only the first RAT, only the second RAT or both RATs.

Figure 4:
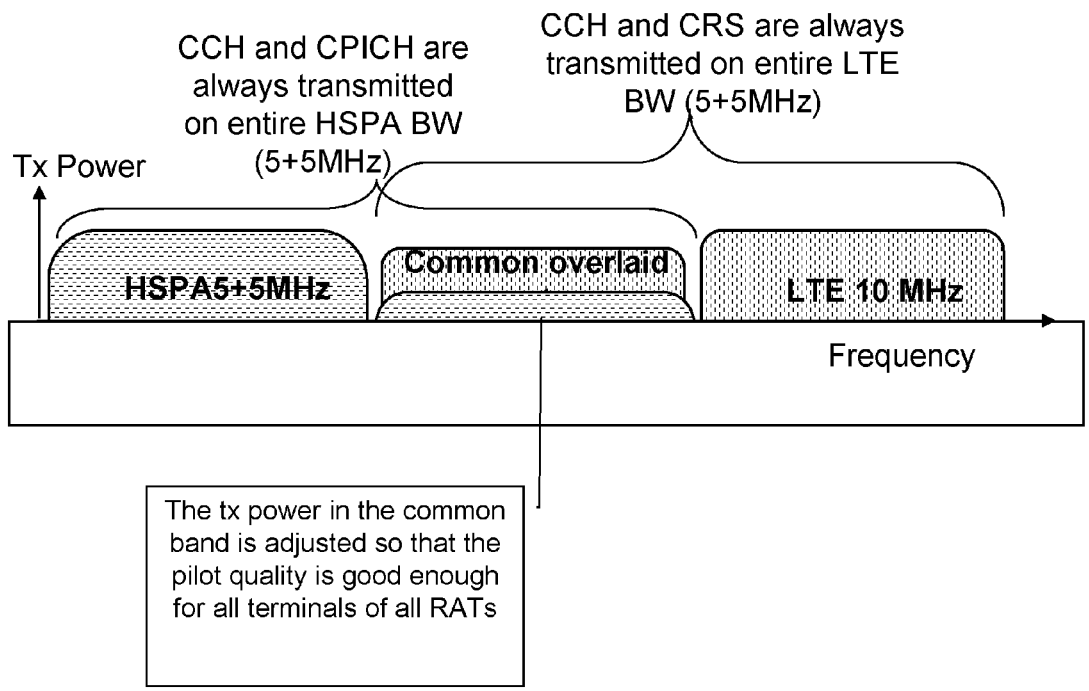
FIG. 4 is a schematic frequency diagram illustrating embodiments of spectrum sharing.
Figure 5:
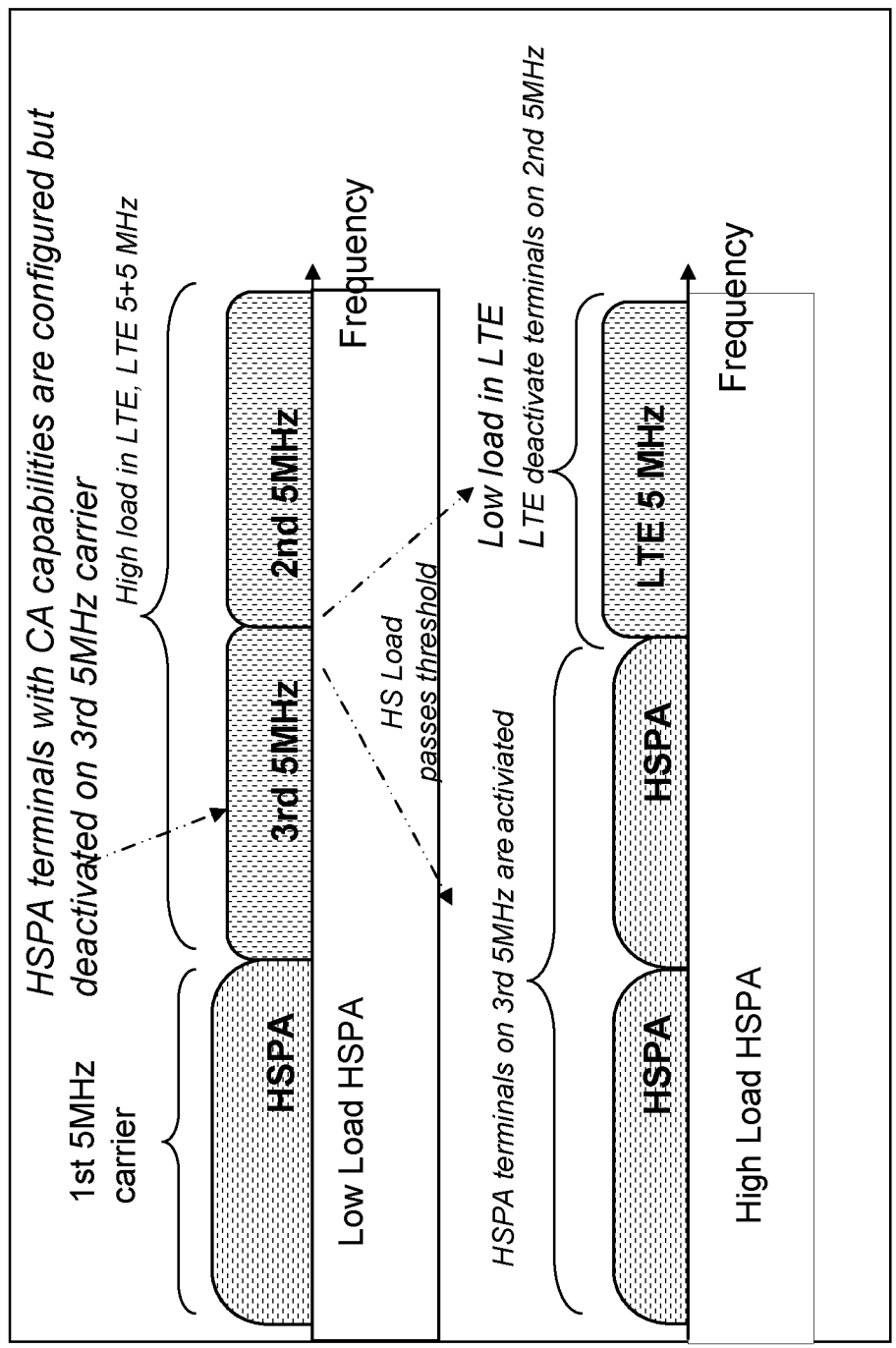
FIG. 5 is a schematic frequency diagram illustrating embodiments of spectrum sharing.

Actions for controlling usage of RAT and bandwidth in the radio communications system 100 will now be described with reference to FIGS. 2, 4 and 5. FIGS. 4 and 5 are schematic exemplifying frequency diagrams illustrating embodiments of spectrum sharing and will be described in more detail below. The actions do not have to be performed in the order stated below, but may be taken in any suitable order. Further, actions may be combined.

Action 201

In order to allocate resources, the radio network node 10 allocates the first RAT to a first frequency bandwidth. For example, this may be performed by a standard network management controlled by a network operator.

Action 202

In order to further allocate resources, the radio network node 10 allocates the second RAT to a second frequency bandwidth. For example, this may be performed by the standard network management controlled by the network operator.

Action 203

In order to allocate further resources, the radio network node 10 allocates the first RAT and the second RAT to a third frequency bandwidth.

The third frequency bandwidth comprises a part of the first frequency bandwidth and/or a part of the second frequency bandwidth.

The radio network node 10 may allocate the first and second RATs to the third frequency bandwidth by the standard network management controlled by the network operator, intra-frequency handover, carrier bandwidth reconfiguration or carrier aggregation.

In some embodiments, the radio network node 10 allocates the first RAT and the second RAT to the third frequency bandwidth by means of Carrier Aggregation (CA). In such embodiments, the third frequency bandwidth is a so called Secondary Component Carrier (SCC) for both the first and the second RAT. The SCC may be active or inactive for a RAT and for terminals 12 having CA capability. When the SCC is active for a RAT, the radio network node 10 has activated the SCC for one of the RATs and for terminals 12 having CA capability and supporting the activated RAT. Further, when the SCC is inactive for a RAT, the radio network node 10 has deactivated the SCC for one of the RATs and for terminals 12 having CA capability and supporting the deactivated RAT. When the SCC is deactivated for a terminal 12, the terminal 12 does not have to monitor signals on the Physical Control Channel (PDCCH) or the Physical Downlink Shared Channel (PDSCH) if the RAT is LTE nor signals on e.g. the High Speed-Shared Control Channel (HS-SCCH) or the High Speed-Physical Downlink Shared Channel (HS-PDSCH) if the RAT is HSPA, which the terminal 12 has to do when the SCC is active.

Action 204

In order to determine which RAT should be allowed to transmit data in the third bandwidth which is a common bandwidth for both the first and the second RATs, the radio network node 10 may further monitor a load, e.g. a traffic load, of the first RAT and/or the second RAT, respectively.

In some embodiments, the radio network node 10 monitors the load as the number of active users of both the first RAT and the second RAT.

However, the load on the first RAT and/or the second RAT may be an UL/DL total bit rate load, e.g. an UL/DL total bite rate load per time unit, an UL/DL code allocation load, an UL/DL resource element load, e.g. an UL/DL hardware usage load, an UL/DL resource block allocation load, an UL inter-ference level load, an UL/DL transmit power usage load, an UL/DL time-slot usage load, and/or an UL/DL total buffer level load, i.e. load based on data buffered at the transmitting circuit but not yet transmitted.

In some embodiments and as long as the load is acceptable, i.e. below a threshold, for the current RAT and bandwidth allocation, the monitoring continues. Thus, the radio network node 10 may further continuously monitor the load in the first RAT and the second RAT.

In some embodiments, the radio network node 10 monitors the load at predefined time intervals.

Action 205

The radio network node 10 may further determine the first RAT to have a higher load than the second RAT, e.g. when the first RAT has a higher data buffer load than the second RAT. However, in some embodiments, the radio network node 10 determines the first RAT to have a higher load than the second RAT, when the first RAT has more active users than the second RAT. If the load of the first RAT is higher than the load of the second RAT, only the first RAT should be allowed to transmit data on the third bandwidth, and the radio network node 10 performs the actions 206-210, which will be described below.

The radio network node 10 may further determine the second RAT to have a higher load than the first RAT, when the second RAT has a higher data buffer load than the first RAT. However, in some embodiments, the radio network node 10 determines the second RAT to have a higher load than the first RAT, when the second RAT has active more active users than the first RAT. If the load of the second RAT is higher than the load of the first RAT, only the second RAT should be allowed to transmit data on the third bandwidth, and the radio network node 10 performs the actions 211-215, which will be described below.

Action 206

When the first RAT has a higher load than the second RAT, the radio network node 10 transmits data for the first RAT in both the first bandwidth and in the third bandwidth. Thus, the first RAT having the highest load, e.g. having most data to send in the buffers is allowed to schedule resources and transmit data in the third bandwidth.

In some embodiments, wherein the third bandwidth is a Secondary Carrier Component, the radio network node 10 activates the first RAT to perform carrier aggregation with the third bandwidth. Further, if the second RAT is active for performing carrier aggregation with the third bandwidth, the radio network node 10 deactivates at the same time the second RAT from performing carrier aggregation with the third bandwidth.

Action 207

The radio network node 10 may further adjust transmit power of the transmission in the third bandwidth in order not to exceed a power threshold.

The transmit power may be adjusted so that the combined transmit power of the first RAT and the second RAT do not exceed a power threshold in order to ensure good quality of pilot signals in case the second RAT's pilot signals, etc., are transmitted in the third bandwidth.

Further, the power threshold may correspond to the maximum transmit power of the first RAT or the second RAT in the third frequency bandwidth.

In some embodiments, the power threshold is determined based on pilot signal or cell reference symbols used for CQI measurements performed by the one or more terminals 12, and wherein the transmit power is adjusted so that the quality of the pilot signals is above a quality threshold. For example, the radio network node 11 may collect the terminal's 12 pilot quality measurements performed on the third bandwidth. This may typically correspond to the so called Channel Quality Index (CQI). Then, the radio network node 10 may adjust the transmit power of the RATs so that the CQIs of all terminals exceed the quality threshold. Typically the RAT that transmit data in the third bandwidth lower the transmit power for the data transmission. Alternatively, the pilot signals of the non-data transmitting RAT may also be increased. In some cases, the transmit power of the pilot signals may even be decreased if the CQIs show high values. The transmit power may continuously be adjusted so that the CQI is kept on a predefined level.

Action 208

When the first RAT has a higher load than the second RAT, e.g. when the traffic in the first RAT is higher than the traffic in the second RAT, the radio network node 10 transmits data for the second RAT only in the second bandwidth.

Action 209

When the first RAT has a higher load than the second RAT, the radio network node 10 transmits common control signals and/or pilot signals for the first RAT in the first and third bandwidth.

In some embodiments, when the first RAT has a higher load than the second RAT, the radio network node 10 is further configured to transmit common control signals and/or pilot signals further comprises transmitting common control signals and/or pilot signals for the second RAT in the second and in the third bandwidth.

However, as previously described, in some embodiments, wherein the third bandwidth is a Secondary Carrier Component, the radio network node 10 may deactivate the second RAT from performing carrier aggregation with the third bandwidth. Thus, in such embodiments, the second RAT may transmit common control signals and/or pilot signals for only in the second bandwidth and not in the third bandwidth.

Action 210

The radio network node 10 may further adjust transmit power of the transmission in the third bandwidth to not exceed a power threshold. This may be performed in the same way as described in action 207 and will therefore not be described in more detail here.

Action 211

When the second RAT has a higher load than the first RAT, e.g. when the traffic in the second RAT is higher than the traffic in the first RAT, the second RAT should be allowed to transmit data in the third bandwidth. The radio network node 10 may then transmit a deactivation message to one or more terminals 12 supporting the first RAT and being active in the third bandwidth. By this, the one or more terminals 12 supporting the first RAT and being active in the third bandwidth will be deactivated.

Action 212

Further, when the second RAT has a higher load than the first RAT, the radio network node 10 may transmit an activation message to one or more terminals 12 supporting the second RAT to be active in the third bandwidth.

In some embodiments, wherein the third bandwidth is a Secondary Component Carrier (SCC), the radio network node 10 may activate the second RAT to perform carrier aggregation with the third bandwidth. Further, if the first RAT is active for performing carrier aggregation with the third bandwidth, the radio network node 10 may deactivate at the same time the first RAT from performing carrier aggregation with the third bandwidth.

Action 213

When the second RAT has a higher load than the first RAT, the radio network node 10 may transmit data for the first RAT only in the first bandwidth.

Action 214

When the second RAT has a higher load than the first RAT, the radio network node 10 may transmit data for the second RAT in the second bandwidth and in the third bandwidth.

Action 215

When the second RAT has a higher load than the first RAT, the radio network node 10 may transmit common control signals and/or pilot signals for the second RAT in both the second bandwidth and in the third bandwidth.

However, as previously described, in some embodiments, wherein the third bandwidth is a Secondary Carrier Component, the radio network node 10 may deactivate the first RAT from performing carrier aggregation with the third bandwidth. Thus, in such embodiments, the first RAT may transmit common control signals and/or pilot signals for only in the first bandwidth and not in the third bandwidth.

Figure 3:
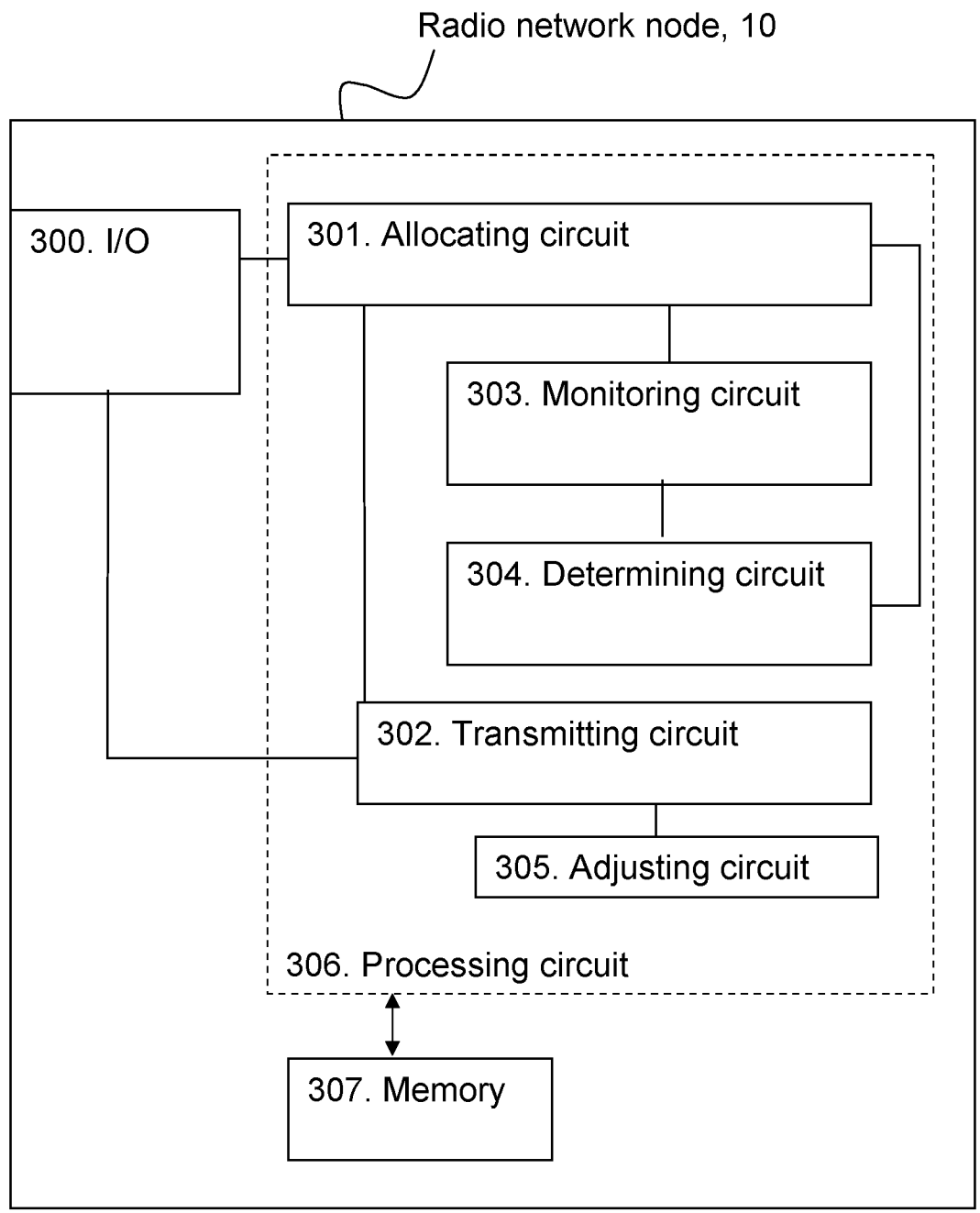
FIG. 3 is a schematic block diagram illustrating embodiments of a radio network node.

To perform the method actions in the radio network node 10 described above, some embodiments of the radio network node 10 comprises the arrangement depicted in FIG. 3. As mentioned above, the radio network node 10 is comprised in the radio communication system 100. The radio network node 10 is further configured to support transmission and reception of signals in the first RAT and in the second RAT. The signal associated with the respective first or second RAT may be a synchronization signal, a pilot signal, cell reference symbols, or a broadcast signal.

Further, the radio communication system 100 may comprise a plurality of terminals 12. Each terminal 12 may be configured to support only the first RAT, only the second RAT or both RATs.

The radio network node 10 may comprise an input and output port 300 configured to function as an interface for communication between the radio network node 10 and one or more terminals 12.

The radio network node 10 is configured to control usage of Radio Access Technology, RAT, and frequency bandwidth in the radio communication system 100. The radio network node 10 comprises an allocating circuit 301 configured to allocate the first RAT to a first bandwidth and the second RAT to a second bandwidth.

Further, the allocating circuit 301 is configured to allocate the first RAT and the second RAT to a third bandwidth. The third bandwidth comprises a part of the first bandwidth and/or a part of the second bandwidth.

In some embodiments, the allocating circuit 301 is configured to allocate the first RAT and the second RAT to the third bandwidth by means of carrier aggregation. In such embodiments, the third bandwidth is a Secondary Component Carrier (SCC) for both the first and the second RAT. The SCC may be active or inactive for a terminal 12 having CA capability, as has been previously described.

The radio network node 10 comprises further a transmitting circuit 302. When the first RAT has a higher load than the second RAT, the transmitting circuit 302 is configured to transmit data for the first RAT in both the first bandwidth and in the third bandwidth and to transmit data for the second RAT only in the second bandwidth.

Further, when the first RAT has a higher load than the second RAT, the transmitting circuit 302 is configured to transmit common control signals and/or pilot signals for the first RAT and in both the first bandwidth and in the third bandwidth.

In some embodiments, when the first RAT has a higher load than the second RAT, the transmitting circuit 302 is further configured to transmit common control signals and/or pilot signals for the second RAT in both the second bandwidth and in the third bandwidth.

When the second RAT has a higher load than the first RAT, the transmitting circuit 302 may further be configured to transmit a deactivation message to one or more terminals 12 supporting the first RAT and being active in the third bandwidth and to transmit an activation message to one or more terminals 12 supporting the second RAT to be active in the third bandwidth.

Further, when the second RAT has a higher load than the first RAT, the transmitting circuit 302 may be configured to transmit data for the first RAT only in the first bandwidth, to transmit data for the second RAT in the second bandwidth and in the third bandwidth, and to transmit common control signals and/or pilot signals for the second RAT in both the second bandwidth and in the third bandwidth.

The radio network node 10 may comprise a monitoring circuit 303 configured to monitor a load of the first RAT and/or the second RAT, respectively.

The load on the first RAT and/or the second RAT may be an UL/DL total bit rate load, e.g. an UL/DL total bite rate load per time unit, an UL/DL code allocation load, an UL/DL resource element load, e.g. an UL/DL hardware usage load, an UL/DL resource block allocation load, an UL interference level load, an UL/DL transmit power usage load, an UL/DL time-slot usage load, and/or an UL/DL total buffer level load, i.e. load based on data buffered at the transmitting circuit but not yet transmitted.

In some embodiments, the monitoring circuit 303 is configured to monitor the load as the number of active users of both the first RAT and the second RAT within the third bandwidth.

The monitoring circuit 303 may further be configured to continuously monitor the load in the first RAT and the second RAT, or to monitor the load at predefined time intervals.

Further, the radio network node 10 may comprise a determining circuit 304 configured to determine the first RAT to have a higher load than the second RAT, when the first RAT has a higher data buffer load than the second RAT.

In some embodiments, the determining circuit 304 is configured to determine the first RAT to have a higher load than the second RAT, when the first RAT has more active users than the second RAT, or to determine the second RAT to have a higher load than the first RAT, when second RAT has more active users than the first RAT.

An adjusting circuit 305 may be comprised in the radio network node 10. The adjusting circuit 305 may be configured to adjust transmit power of the transmission in the third bandwidth to not exceed a power threshold.

The power threshold may correspond to the maximum transmit power of the first RAT or the second RAT in the third bandwidth.

In some embodiments, the power threshold is determined based on pilot signal measurements performed by the one or more terminals 12. Then, the transmit power may be adjusted so that the quality of the pilot signals for the one or more terminals 12 exceed a power reception threshold.

Embodiments herein for controlling usage of RAT and bandwidth in a radio communications system may be implemented through one or more processor, e.g. microprocessor, such as a processing circuit 306 in the radio network node 10 depicted in FIG. 3, together with computer program code for performing the functions and/or method actions of embodiments herein.

The radio network node 10 may further comprise a memory 307. The memory may comprise one or more memory units and may be used to store for example data and/or information such as data and/or information relating to RATs, frequency bandwidths and load thresholds.

FIG. 4 is a schematic exemplifying frequency diagram illustrating embodiments of spectrum sharing. In the exemplifying frequency diagram, 15 MHz is available for an operator with both HSPA and LTE capability. Instead of dividing the spectrum to e.g. 5 MHz LTE and 10 MHz HSPA, embodiments described herein allow an allocation of 10 MHz for HSPA and 10 MHz for LTE. The first RAT is HSPA and is illustrated with horizontal dotted lines, and the second RAT is LTE and is illustrated with vertical dotted lines.

However, it should be understood that the entire bandwidth, e.g. the entire 15 MHz, may be used as common, overlaid bandwidth and thus 15 MHz for both RATs is possible, i.e. both the first and second bandwidths are 15 MHz. In the third, common, frequency bandwidth, only one RAT at a time may transmit data, whereas the synchronization signals, pilot signals, cell reference symbols, broadcast signals, control channel signals or data signals for both RATs are transmitted simultaneously.

In order to determine which RAT should be allowed to transmit on the common bandwidth may be to base the decision on the number of active users for the respective RATs. If one RAT does not have any active users, the other RAT(-s) may use the common bandwidth for transmission.

By the term "active user", when used herein, is meant users in Cell Dedicated Channel (CELL_DCH) state and/or in Cell Forward Access Channel (CELL_FACH) state for HSPA, even if they are not transmitting anything. For LTE, an active user is a user in LTE ACTIVE state.

An alternative way of determining which RAT should be allowed to transmit in the common bandwidth may be to determine which RAT has most data in the transmit buffer, e.g. in the UL transmit buffer and/or in DL transmit buffer, and allowed that RAT to transmit data in the common bandwidth, while the other RAT(-s) is not allowed to transmit or schedule any data for the common bandwidth.

Users from the RAT that is not allowed to transmit any data may still be in active state, such as in CELL_DCH or CELL_FACH state for HSPA or in LTE ACTIVE state for LTE. Therefore, the transmit power setting of the RAT transmitting data must be adjusted so that the pilot signals from the non-data transmitting RAT has good enough quality. This makes it possible for the users of the non-data transmitting RAT to keep their synchronization.

Furthermore, it may be important for mobility reasons too, that terminals in neighbouring cells base their handover decisions on the pilot measurements. In HSPA, the Common Pilot Indicator Channel (CPICH) carries the pilot information in downlink and is typically dimensioned relative the maximum transmit power of that RAT, i.e. HSPA, for a carrier.

Thus, one way to achieve the pilot quality of the CPICH is that the combined transmit power in the common bandwidth never exceeds the maximum transmit power of one RAT in that carrier.

However, another way may be to adapt the transmit power of both RATs so that all terminals 12 achieve a good enough pilot quality. This can also mean that it may be possible to lower the common channel, e.g. CPICH, of the non-data transmitting RAT, e.g. HSPA, and/or increase the data transmitting RAT transmit power.

FIG. 5 is another schematic exemplifying frequency diagram illustrating embodiments of spectrum sharing. In the exemplifying frequency diagram, 15 MHz is available for an operator with both HSPA and LTE capability. The first RAT is HSPA and is illustrated with horizontal dotted lines, and the second RAT is LTE and is illustrated with vertical dotted lines.

In FIG. 5, a contiguous carrier-aggregated spectrum is shown, however it should be understood that non-contiguous carrier-aggregated spectrum is also possible.

In the upper frequency diagram of FIG. 5, three 5 MHz carriers are shown. Further, it is shown that LTE utilizes a total bandwidth of 10 MHz, which total bandwidth comprises two 5 MHz carriers aggregated by Carrier aggregation. The first 5 MHz carrier is allocated to HSPA. The second 5 MHz carrier is a so called Secondary Component Carrier (SCC) or Secondary Cell (SCell). As previously mentioned, the third bandwidth corresponds to the SCC for embodiments comprising carrier aggregation. The third 5 MHz carrier is a so called Primary Component Carrier (PCC) or Primary Cell (PCell). The first 5 MHz carrier and the third 5 MHz carrier correspond to the first and second bandwidths described above. Further, the HSPA terminals 12 capable of carrier aggregation are inactive in the second 5 MHz carrier.

The radio network node 10 may be configured to measure the load of the respective RATs, e.g. of HSPA and LTE respectively. For example, the load may be the amount of data in the DL and UL send buffers of respective RAT, or the number of currently transmitting users in the respective RAT.

If for example, the load in HSPA exceeds the load in LTE, the radio network node 10 is configured to switch which RAT that performs carrier aggregation with the second 5 MHz carrier, cf. the lower frequency diagram of FIG. 5. As illustrated in the lower frequency diagram, HSPA is performing carrier aggregation with the second 5 MHz carrier. In order to switch RAT, the radio network node 10 sends a deactivation message to LTE terminals 12 that are active in the SCC (i.e. using carrier aggregation with the second 5 MHz carrier). The deactivation message may be sent using signalling according to prior art, e.g. using Medium Access Control (MAC) signalling. When all LTE terminals 12 have been inactivated in the second 5 MHz carrier, HSPA starts to activate the carrier aggregated capable terminals 12 to use the second 5 MHz carrier as a SCell. The LTE terminals 12 in the SCC do not have to monitor the PDCCH and the PDSCH, and do not transmit anything in PUSCH.

Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

When using the word "comprise" or "comprising" it shall be interpreted as non-limiting, in the meaning of "consist at least of".

When using the word action/actions it shall be interpreted broadly and not to imply that the actions have to be carried out in the order mentioned. Instead, the actions may be carried out in any suitable order other than the order mentioned. Further, some action/actions may be optional.

The embodiments herein are not limited to the above described examples. Various alternatives, modifications and equivalents may be used. Therefore, the above examples should not be taken as limiting the scope of the invention, which is defined by the appending claims.

The invention claimed is:

1. A method in a radio network node for controlling usage of Radio Access Technology, RAT, and bandwidth in a radio communication system, wherein the radio communication system comprises the radio network node configured to support transmission and reception of signals in a first RAT and in a second RAT, wherein the radio communication system comprises a plurality of terminals, and wherein each terminal supports only the first RAT, only the second RAT or both RATs, the method comprising:
    allocating the first RAT to a first bandwidth;
    allocating the second RAT to a second bandwidth;
    allocating the first RAT and the second RAT to a third bandwidth comprising a part of the first bandwidth and/or a part of the second bandwidth; and
    when the first RAT has a higher load than the second RAT:
    transmitting data for the first RAT in both the first bandwidth and in the third bandwidth;
    transmitting data for the second RAT only in the second bandwidth;
    transmitting common control signals and/or pilot signals for the first RAT in both the first bandwidth and in the third bandwidth; and
    transmitting common control signals and/or pilot signals for the second RAT in the second and third bandwidths.

2. The method of claim 1, further comprising:
    monitoring data buffer load of the first RAT and the second RAT, respectively; and
    determining the first RAT to have a higher load than the second RAT, when the first RAT has a higher data buffer load than the second RAT.

3. The method of claim 1, further comprising:
    monitoring the number of active users of both the first RAT and the second RAT; and
    determining the first RAT to have a higher load than the second RAT, when the first RAT has more active users than the second RAT.

4. The method of claim 1, further comprising:
    adjusting transmit power of the transmission in the third bandwidth to not exceed a power threshold.

5. The method of claim 4, wherein the power threshold corresponds to the maximum transmit power of the first RAT or the second RAT in the third bandwidth.

6. The method of claim 4, wherein the power threshold is determined based on pilot signal measurements performed by one or more terminals, and wherein the transmit power is adjusted so that the quality of the pilot signals is above a quality threshold.

7. The method of claim 1, wherein the first RAT and the second RAT are allocated to the third bandwidth by means of carrier aggregation.

8. The method of claim 7, further comprising:
    when the second RAT has a higher load than the first RAT,
    transmitting a deactivation message to one or more terminals supporting the first RAT and being active in the third bandwidth; and
    transmitting an activation message to one or more terminals supporting the second RAT to be active in the third bandwidth.

9. The method of claim 8, further comprising:
    when the second RAT has a higher load than the first RAT,
    transmitting data for the first RAT only in the first bandwidth;
    transmitting data for the second RAT in the second bandwidth and in the third bandwidth; and
    transmitting common control signals and/or pilot signals for the second RAT in both the second bandwidth and in the third bandwidth.

10. The method of claim 7, wherein the second bandwidth is a secondary component carrier.

11. The method of claim 1, wherein the load in the first RAT and the second RAT is continuously monitored.

12. A radio network node for controlling usage of Radio Access Technology, RAT, and bandwidth in a radio communication system, wherein the radio communication system comprises the radio network node configured to support transmission and reception of signals in a first RAT and in a second RAT, wherein the radio communication system comprises a plurality of terminals, and wherein each terminal supports only the first RAT, only the second RAT or both RATs, the radio network node comprising:
    an allocating circuit configured to:
        allocate the first RAT to a first bandwidth,
        allocate the second RAT to a second bandwidth, and
        allocate the first RAT and the second RAT to a third bandwidth, wherein the third bandwidth comprises a part of the first bandwidth and/or a part of the second bandwidth; and
    a transmitting circuit configured to, when the first RAT has a higher load than the second RAT:
        transmit data for the first RAT in both the first bandwidth and in the third bandwidth,
        transmit data for the second RAT only in the second bandwidth,
        transmit common control signals and/or pilot signals for the first RAT in both the first bandwidth and in the third bandwidth, and
        transmit common control signals and/or pilot signals for the second RAT in both the second bandwidth and in the third bandwidth.

13. The radio network node of claim 12, further comprising:
    a monitoring circuit configured to monitor data buffer load of the first RAT and the second RAT, respectively; and
    a determining circuit configured to determine the first RAT to have a higher load than the second RAT, when the first RAT has a higher data buffer load than the second RAT.

14. The radio network node of claim 12, further comprising:
    a monitoring circuit configured to monitor the number of active users of both the first RAT and the second RAT; and
    a determining circuit configured to determine the first RAT to have a higher load than the second RAT, when the first RAT has more active users than the second RAT.

15. The radio network node of claim 12, further comprising:
    an adjusting circuit configured to adjust transmit power of the transmission in the third bandwidth to not exceed a power threshold.

16. The radio network node of claim 15, wherein the power threshold corresponds to the maximum transmit power of the first RAT or the second RAT in the third bandwidth.

17. The radio network node of claim 15, wherein the power threshold is determined based on pilot signal measurements performed by one or more terminals, and wherein the transmit power is adjusted so that the quality of the pilot signals for the one or more terminals exceed a power reception threshold.

18. The radio network node of claim 12, wherein the first RAT and the second RAT are allocated to the third bandwidth by means of carrier aggregation.

19. The radio network node of claim 18, wherein the transmitting circuit further is configured to, when the second RAT has a higher load than the first RAT, transmit a deactivation message to one or more terminals supporting the first RAT and being active in the third bandwidth and transmit an activation message to one or more terminals supporting the second RAT to be active in the third bandwidth.

20. The radio network node of claim 18, wherein the transmitting circuit further is configured to, when the second RAT has a higher load than the first RAT, transmit data for the first RAT only in the first bandwidth, transmit data for the second RAT in the second bandwidth and in the third bandwidth, and transmit common control signals and/or pilot signals for the second RAT in both the second bandwidth and in the third bandwidth.

21. The radio network node of claim 18, wherein the second bandwidth is a secondary component carrier.

22. The radio network node of claim 12, wherein the load in the first RAT and the second RAT is continuously monitored.

\* \* \* \* \*